UNITED STATES PATENT OFFICE.

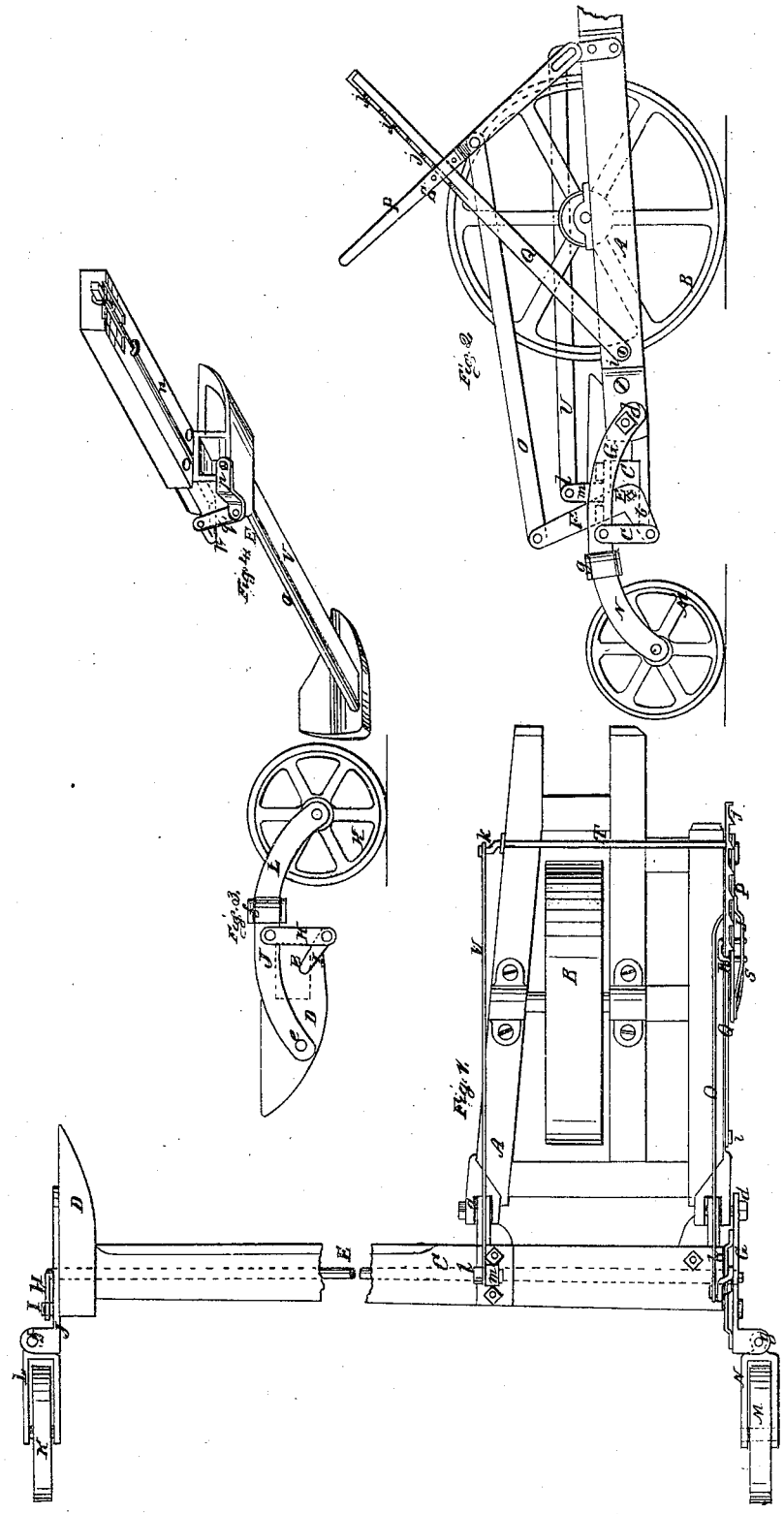

GUSTAVUS STONE AND JOSEPH R. BULLOCK, OF BELOIT, WISCONSIN.

IMPROVEMENT IN HARVESTERS.

Specification forming part of Letters Patent No. 46,830, dated March 14, 1865.

*To all whom it may concern:*

Be it known that we, GUSTAVUS STONE and JOSEPH P. BULLOCK, of Beloit, in the county of Rock and State of Wisconsin, have invented a new and useful Improvement in Reaping and Mowing Machines; and we do hereby declare that the following is a full, clear, and exact description thereof, which will enable others skilled in the art to make and use the same, reference being had to the accompanying drawings, forming part of this specification, in which—

Figure 1 is a plan or top view of our invention; Fig. 2, a side view of the same; Fig. 3, a detached view of the grain-wheel and corresponding end of the cutter-bar; Fig. 4, a perspective view of the main portion of the improvement as applied to a mowing-machine.

Similar letters of reference indicate like parts.

This invention relates to a new and improved means for adjusting the cutter or finger bar—that is to say, raising and lowering the same, so that the grass or grain may be cut at any desired height, and the cutter or finger bar also temporarily raised, so that it may pass over obstructions which may lie in its path.

A represents the main frame of a reaper, in which the driving-wheel B is placed. This main frame is connected at its rear end by hinges $a$ to the cutter or finger bar C, the outer or grain end of which is provided with a track-clearer, D. In the under side of the cutter or finger bar C there is fitted a rod or shaft, E, which is allowed to turn freely in its bearings. This rod or shaft E has a bent or right-angular lever, F, at one end of it, the lower and shorter arm, $b$, of which is connected by a link, $c$, with a curved bar, G, the front end of the latter being connected by a pivot-bolt, $d$, with the main frame A. The opposite end of the rod or shaft E is provided with a crank, H, which is connected by a link, I, with a bar, J, the front end of which is connected by a pivot-bolt, $e$, with the track-clearer D. The bar J has a caster-wheel, K, at its rear, the frame L of said wheel being secured to the bar J by a pivot-bolt, $f$. The bar G also has a caster-wheel, M, at its rear end, the frame N of which is secured to the bar G by a pivot-bolt, $g$. The lever F passes through a guide, $h$, attached to the inner side of the bar G. This guide serves to steady the lever F. The upper end of the lever F is connected by a rod or bar, O, with a lever, P, the lower end of which has its fulcrum at the front end of the main frame A, and the main frame has a bar, Q, secured to it by a pivot, $i$, said bar being formed with a series of notches, $j$, and passing through a loop or staple, R, which passes through the lever P, and has its ends secured to a spring, S, which is attached to the lever P. This spring S has a tendency to keep the lever P engaged with the notches $j$— any of them—and it will be seen by actuating the lever P the lever F, rod or shaft E, and crank H will be actuated, and the cutter or finger bar C raised or lowered and secured at any desired deight by fitting the lever P in the proper notch $j$ in the bar Q. The fulcrum of the lever P is a shaft, T, which has its bearings on the main frame A, said shaft extending transversely across the latter and having a crank, $k$, at the end opposite to that where the lever P is attached. This crank $k$ has one end of a rod, U, attached to it, the opposite end of the latter being connected by a pivot-bolt, $l$, with a short standard, $m$, on the cutter or finger bar. By this arrangement a parallel position of the finger or cutter bar is obtained at all times or in every position or adjustment of the latter.

When the invention is applied to reapers, the rod or shaft E extends under the whole length of the cutter or finger bar, as grain is always cut at a much greater height than grass.

In applying the invention to a mowing-machine the cutter or finger bar V is necessarily lower than the main frame A, (see Fig. 4,) in order that the grass may be cut quite close to the surface of the ground, and the rod or shaft E is divided into two parts, $n$ $o$, the former being under the rear bar of the frame A, and the latter under the cutter or finger bar. These two parts $n$ $o$ of the rod or shaft E are connected by two cranks, $p$ $p$, and a link, $q$, so that the same result is obtained as if the rod or shaft were a single piece.

Having thus described our invention, we claim as new and desire to secure by Letters Patent—

1. The curved arms G J, bell-crank lever F $b$, and links $c$ H, constructed as herein described, in combination with the caster-wheels K L M N, crank-shaft E I, and bar C, all arranged and employed in the manner and for the purposes specified.

2. In combination with the above, the lever P, notched bar Q, shaft T, provided with the crank $k$, and connecting-rods O U, all arranged in connection with the main frame A and cutter or finger bar C, to operate as and for the purpose specified.

GUSTAVUS STONE.
JOSEPH P. BULLOCK.

Witnesses:
P. M. PIERCE,
ALLEN W. HANAFORD.